[11] 3,548,107

[72] Inventors James E. Webb
Administrator of the National Aeronautics and Space Administration with Respect to an Invention of;
Lawrence Y. Lim, Monterey Park, Calif.
[21] Appl. No. 725,432
[22] Filed April 30, 1968
[45] Patented Dec. 15, 1970

[54] SIGNAL PROCESSING APPARATUS FOR MULTIPLEX TRANSMISSION
7 Claims, 4 Drawing Figs.
[52] U.S. Cl. .................................. 179/15; 324/77
[51] Int. Cl. ................................... H04j 3/00
[50] Field of Search ........................... 179/1AS, 15.55, 15OR, 15A, 15BWR; 324/77

[56] References Cited
UNITED STATES PATENTS
| | | | |
|---|---|---|---|
| 3,349,183 | 10/1967 | Campanella | 179/15.55 |
| 3,384,715 | 5/1968 | Higuchi | 179/15(OR) |
| 3,435,147 | 3/1969 | Malm | 179/15(A) |
| 2,768,352 | 10/1956 | Von Sivers | 179/15(ACE) |

*Primary Examiner*—Ralph D. Blakeslee
*Attorneys*—J. H. Warden, D. E. Leslie and G. T. McCoy

ABSTRACT: Apparatus is described for sampling an input signal during a sampling period by deriving its Fourier components to allow reconstruction by a Fourier approximation. The sampling apparatus comprises many coefficient generators, each of which modulates the input signal by a sinusoidal wave and integrates the product over the sampling period to obtain a Fourier component coefficient.

INVENTOR.
LAWRENCE Y. LIM 3,548,107

SIGNAL PROCESSING APPARATUS FOR MULTIPLEX TRANSMISSION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to multiplex telemetry system and more particularly to signal processing apparatus for use in such systems.

Many applications require the use of time multiplexed telemetry systems for successively coupling a number of separate information channels to a common communication channel. For example, such systems are used to monitor various conditions of a spacecraft such as temperature and voltage levels. The sensors detecting these conditions are periodically sampled by a commutatorlike device and the samples are then coupled to the communication channel. Each sample can represent merely the integral of a sensor output over a sampling time. However, if the monitored condition is changing or oscillating rapidly, such information will not be transmitted, and the rapid variations will go entirely unnoticed. For example, if a voltage supply is rapidly oscillating, a simple periodic sample at long intervals will not indicate that such oscillations are occurring.

One way of detecting oscillations or rapid variations is to take many measurements during each sampling period. However, this results in an undue increase in the bandwidth requirements of the transmitter. This is particularly true if the many measurements are taken and transmitted regardless of whether or not there are rapid variations. A sampling system which indicated the level of rapid variations occurring during a sampling interval with a minimum of bandwidth, and in a manner which facilitated reconstruction of the signal, would be useful in communication where a limited bandwidth was available. If the samples could also be used to indicate whether a few or many measurements should be transmitted for any given sampling interval, an even greater reduction in bandwidth requirements could be achieved.

OBJECTS AND SUMMARY OF THE INVENTION

One object of the present invention is to provide apparatus for generating signal samples having more useful information for a given transmission bandwidth.

Another object is to provide signal samples which enable a more accurate reconstruction of the original signal.

In accordance with the present invention, there is provided apparatus including a commutator for periodically sampling a number of channels. Each of the channels which is sampled carries an analogue signal which may vary within a wide range of frequencies. A plurality of separate sampling circuits is connected to the output of the commutator. Each sampling circuit monitors the signal during the sampling time to determine the amplitude of a particular frequency component. The sum of these components can be used to reconstruct the original signal by a Fourier approximation. In order to conserve bandwidth, the apparatus may also include circuitry for allowing the transmittal of only one or a limited number of low frequency components of the sample during those sampling intervals when the signal has no high frequency components.

In one embodiment of the invention a commutator switch advances from one signal source to the next at the end of each sampling period. The output of the switch is processed by a complex of many Fourier coefficient generators. Each of the generators multiplies the input signal by a signal of a predetermined frequency, and integrates the product during a sampling period to obtain the Fourier coefficient for that frequency. Generally, a pair of coefficient generators is used for each frequency, one of which multiplies the input signal by a sine wave and the other by a cosine wave (i.e., 90° out of phase with the sine wave wave) of the same frequency. In addition, the simple integral of the input signal over the sampling period is derived. All of these coefficients may be transmitted at the end of each sampling period to enable reconstruction of the input signal.

In another embodiment of the invention, logic circuitry is used to transmit only those coefficients of appreciable magnitude. The fact that the magnitude of all coefficients, up to a certain frequency, are already derived simplifies the determination of which ones are of appreciable magnitude.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
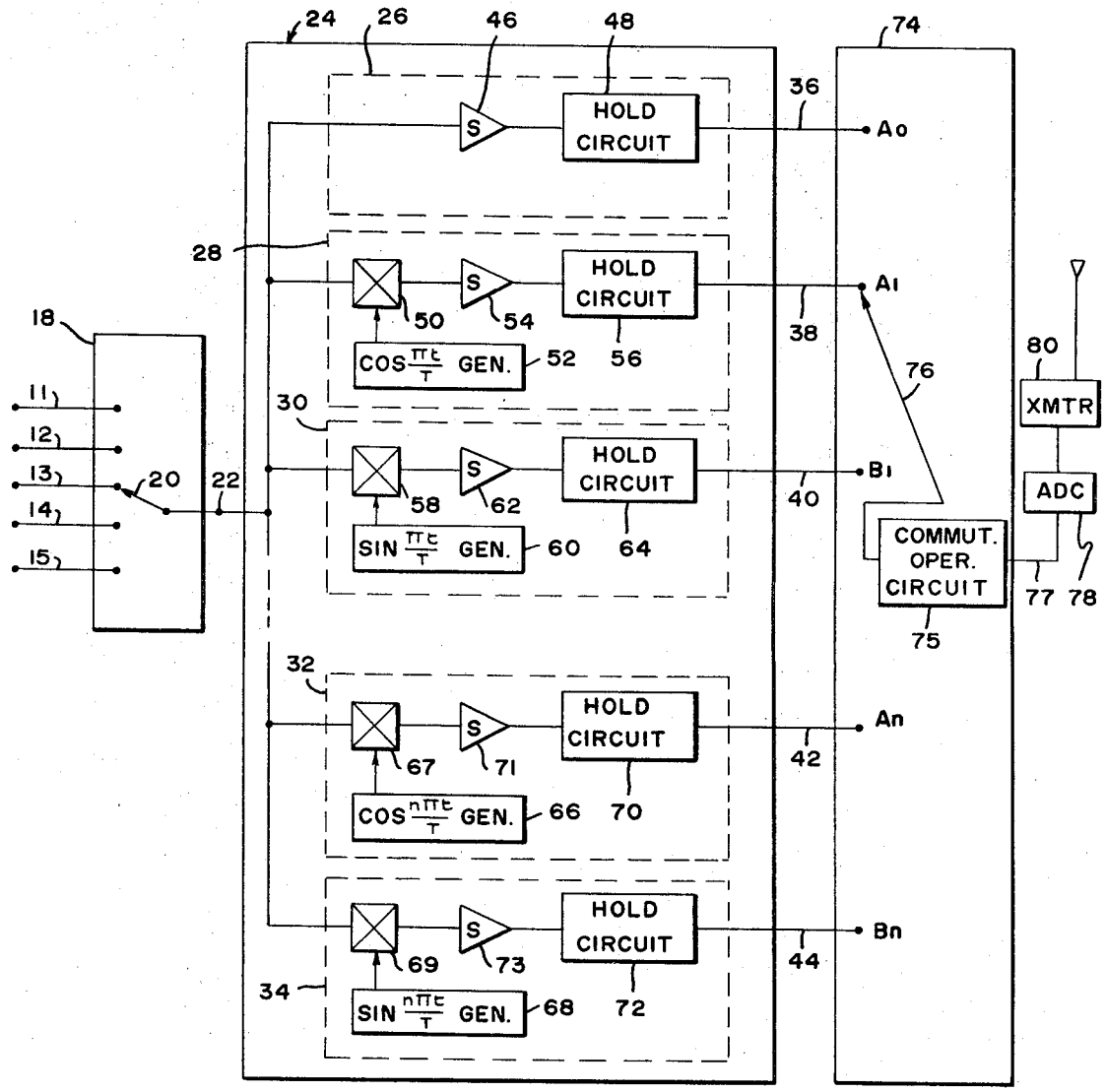
FIG. 1 is a block diagram representation of sampling apparatus constructed in accordance with the invention.

FIG. 1 shows a signal processing circuit for sampling a number of input signals received at five input channels 11, 12, 13, 14, and 15. These five channels may be the outputs from various sensors aboard a spacecraft, such as those that sense temperatures, voltage levels, and radiation levels. The input signals are received by a commutator switch 18 having a contact 20 which is driven at a constant rate to periodically contact each of the five input channels for a predetermined sampling interval. The output of the switch is delivered at a terminal 22 to a sampling complex 24. The sampling complex comprises a plurality of coefficient generators 26, 28, 30, 32, and 34. Each of the coefficient generators derives the amplitude of a particular frequency component in the input signal being sampled, during the sampling time.

The coefficient generators 26 through 34 provide coefficients which enable reconstruction of a sample by a Fourier approximation. It is well known that any periodic wave can be closely approximated by the sum of a limited number of sinusoidal functions. A Fourier series approximation is commonly given as:

$$f(t) = \frac{A_0}{T} + \frac{2}{T}\sum_{i=1}^{i=n} (A_i \cos \omega_i t + B_i \sin \omega_i t)$$

Equation 1 where $A_0$ is the average value, $A_i$ and $B_i$ are the amplitudes of the various coefficients at the frequencies $f_i = \frac{\omega_i}{2\pi}$, and T equals the period of the periodic function. This same analysis can be applied to approximate a nonperiodic waveform during the period T by applying it only to that interval. In this case, T can equal one-half the sampling period. For a sampling apparatus wherein the sampling period T is always the same, the only data which must be transmitted are the levels of the coefficients A and B.

The outputs of the coefficient generators 26 through 34 are the coefficients of the sinusoidal wave, which approximate the sample during the sampling period. The output 36 labeled $A_0$ is the average value of the signal during the sampling period. The outputs 38 through 44, labeled $A_1$, $B_1$ through $A_n$, $B_n$, indicate the cosine and sine coefficients at various frequencies. Knowledge of each of these components allows the reconstruction of the sample, and the greater the number of these coefficients, the greater the accuracy of the reconstruction.

The coefficient generator 26 comprises an integrator 46 which integrates the input signal during the sampling period, and a hold circuit 48 which holds the value received at the end of the sampling period. The next coefficient generator 28 comprises a multiplying circuit 50 having an input from the sampling terminal 22 and another input from a $\cos \frac{\pi l}{T}$ generator 52 (where T is the sampling interval). The output from the multiplying circuit 50 is entered into an integrator 54 which has been reset to zero at the beginning of the sampling interval. The integral of the multiplying generator output for the sampling period T is equal to the coefficient of the lowest frequency cosine wave, $A_1$. This value of the integral is held by a second hold circuit 56 for later readout.

The third coefficient generator 30 includes a multiplying circuit 58 which multiplies the input signal at terminal 22 by the signal from a generator 60 which generates the waveform $\sin \frac{\pi l}{T}$. The product is integrated during a sampling period by an integrator 62, and the value of the integral is held by a hold circuit 64. The output of the hold circuit 64 is the coefficient $B_1$ in the Fourier equation given above as equation 1.

The sampling complex 24 includes additional coefficient generators between those at 30 and 32, which are similar to the generators 28 and 30, but which multiply the input signal by the higher order cosine and sine waves of the Fourier series. These are, of course, integral multiples of a fundamental frequency, such as the frequency $\frac{1}{2}T$. A last pair of coefficient generators 32 and 34 includes sinusoidal generators 66 and 68 which generate signals equal to the cosine and sine of $\frac{n\pi l}{T}$, where n is any integer. The larger the value of n, the more accurately can the waveform sampling be given, particularly where rapid variations occur during the sampling period. The output of multipliers 67 and 69 are integrated by integrators 71 and 73. The output of the hold circuits 70 and 72 are the coefficients $A_n$ and $B_n$.

At the end of a sampling period T, the hold circuits of the sampling complex 24 constantly deliver an analogue signal with an amplitude equal to the Fourier coefficients $A_0$, $A_1$, $B_1$, etc. These outputs are delivered to a commutator switch 74 where a movable contact 76, controlled by a commutator operating circuit 75, is sequentially connected to each of the lines 36, 38, 40, etc., to 42, and 44. The output 77 of contact 76 is connected to an analog-to-digital converter 78, which converts each analogue Fourier coefficient to a digital value. The output of the ADC 78 is delivered to a transmitter circuit 80 for processing and transmission.

At the end of each sampling period T, the contact 20 of the commutator switch 18 is moved to a next input channel, such as channel 14. At the same time, the sampling complex 24 must be prepared to sample the new signal by resetting the value in the integrators 46, 54, 62, etc., to zero. The values in the hold circuits 48, 56, etc., are not changed until the end of the new sampling period. During the next period of duration T, when a new channel is being sampled, the contact 76 of commutator switch 74 makes contact with every output $A_0$ through $B_n$ of the sampling complex. At the end of the new sampling period, the values in the hold circuits 48, 56, etc., are reset, and the new values from the integrators 46, 54, etc., are entered therein. A clock (not shown) is connected to the hold circuits, integrator circuits, and commutator switch to reset and operate them.

All of the cosine and sine generators 52, 60, etc., are synchronized with each other and synchronized with the sampling periods. Accordingly, all of the of the cosine and sine signal begin from their initial values at the beginning of each sampling period, except for the first two sinusoidal generators 52 and 60. The generators 52 and 60 generate the inverse of the cosine and sine signals at every other period, but this fact can be taken into account at the receiver during reconstruction of the sample. Alternatively, the output of the generators 52 or 60, or of the multiplying circuits, integrators, or hold circuits of the first two coefficient generators can be multiplied by −1 at every other cycle. It should be understood that waveforms other than sinusoidal waves can be used; for example, square waves with the same repetition frequencies as the sinusoidal waves described above can be used. Also, the lowest frequency can be one with a period equal to an entire sampling period instead of half of a sampling period, or it can have some other relationship to the sampling period.

Figure 2:
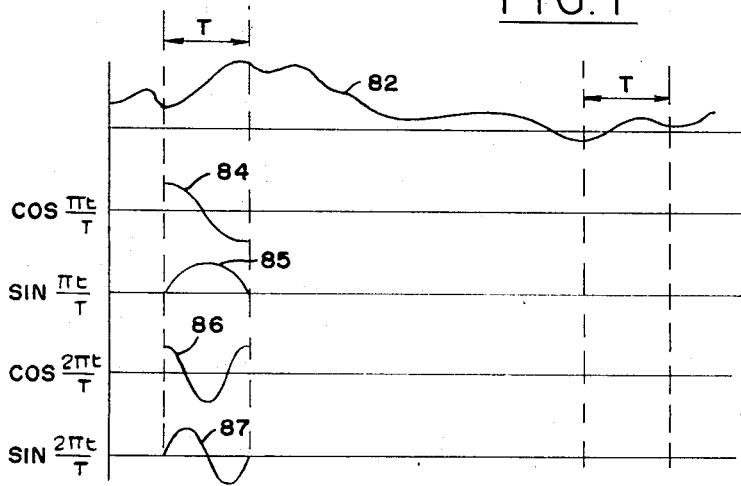
FIG. 2 shows the waveforms of various signals utilized in the circuit of FIG. 1.

FIG. 2 shows the waveforms of a signal 82 to be sampled, which is sampled during periods T which are spaced apart. The multiplying signals from the cosine and sine generators during one sampling period are shown at 84, 85, 86, and 87, for the second through fourth sinusoidal generators. It should be noted that the period T does not include points at the very beginning or end of the interval, when the commutator output may include a rapidly changing signal due to switching to a new channel.

In some applications, every coefficient generator of the sampling complex is sampled during each sampling period to transmit all coefficients $A_0$ through $B_n$. However, the types of phenomena to be measured, such as a temperature or radiation level, generally will not have rapid variations during a sampling period, and only the first few Fourier coefficients will have an appreciable value. In fact, in many typical applications, only one of the many phenomena to be sampled is likely to be varying at a rapid rate at any given time. Further saving in bandwidth requirements can be realized by sampling all or most of the Fourier coefficient values of a sample only when the higher order coefficients are varying rapidly.

Figure 3:
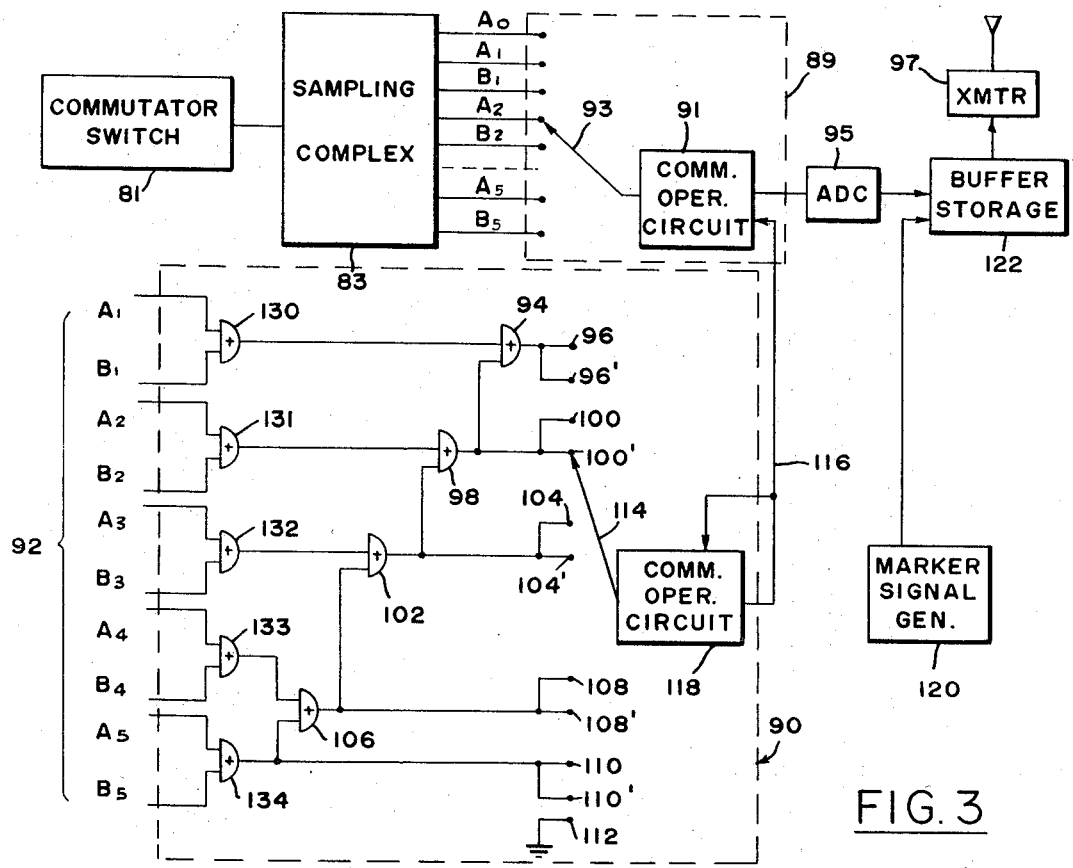
FIG. 3 is a block diagram representation of another embodiment of the invention.

FIG. 3 is a block diagram of a circuit for use in connection with the circuit of FIG. 1 to limit the number of coefficients sampled to only those which have a large value. The circuit of FIG. 3 includes a first commutator switch 81, a sampling complex 83, and a second commutator switch 89, similar to those in FIG. 1. However, the circuit includes a commutator operating circuit 91 for operating a contact 93 in a different manner. The operating circuit 91 does not move the contact 93 to always contact every input $A_0$ through $B_n$ before returning to the initial position $A_0$. Instead, the circuit 91 is controlled by a compression logic circuit 90 so that the contact 93 returns to its initial position $A_0$ at an earlier time, if the higher Fourier coefficients are substantially zero.

The compression logic circuit 90 makes the contact 93 return to the initial position $A_0$ when the contact reaches the last Fourier coefficient of any appreciable value. At this point, any further movement of contact 93 would provide additional outputs which were all zero. The logic circuit 90 has inputs 92 which are the outputs from all of the coefficient generators of the sampling complex 83 except the first. Thus, the integral values representing the coefficients $A_1$ through the highest coefficient, which is labeled $B_5$ in this particular case, is delivered to the compression logic circuit. If any of the coefficients $A_1$ through $B_5$ has an appreciable value, the OR gate 94 will deliver an appreciable output on its output contact 96. If any of the coefficient values $A_2$ through $B_5$ is appreciable, then OR gate 98 will deliver an output at 100. Similarly, if any of the coefficients $A_3$ through $B_5$ is appreciable, or gate 102 will deliver an output to contact 104, while an appreciable coefficient on any of the lines $A_4$ through $B_5$ will cause OR gate 106 to deliver an output at 108.

When contact 93 is at a first contact $A_0$, a commutator 114 of the compression logic circuit is contacting terminal 96. If the voltage at 96 is high, both commutator operating circuits 91 and 118 cause their contacts 93 and 114 to step to the next position, so that contact 93 contacts $A_1$ while 114 contacts 96'. The output from the contact 93 is delivered to ADC circuit 95 and from there to a buffer storage 122, for each step of the commutator contact 93.

Contact 93 then steps to $B_1$ while contact 114 steps to 100. If the terminal 100 has a low output, indicating that the $A_2$ through $B_5$ coefficients are all zero, then a zero signal at 116 is generated. Both commutator operating circuits 91 and 118 will then immediately go back to their initial operating positions at $A_0$ and 96, respectively, after the sample at $B_1$ is taken. No further advances of the contacts 93 and 114 occur until the next sampling period. If all of the coefficients are appreciable, however, then both commutator contacts 93 and 114 will step to the very last contacts $B_5$ and 112. The contact 112 has a zero value and causes the return of both commutator contacts to zero. At the end of the sampling period, a marker signal generator 120 generates a marker signal which is delivered to the buffer storage 122, to indicate that the last sample delivered through the ADC 95 to the buffer storage was the last coefficient taken during that sampling period.

The buffer storage 122, which receives the samples and marker signals, may receive one or a large number of samples during each sampling period. However, it stores all samples and delivers them at a constant rate. The average rate at which signals are delivered from the buffer storage 122 to the transmitter 97 is relatively low, as it represents an average rate of only a few samples per sampling period T. However, any one of the channels may have a sample represented by a large number of coefficient values taken during the sampling period, during those times when the channel being sampled has a rapidly varying signal. Thus, even though detailed information can be transmitted about any of the sampled conditions, the bandwidth requirements for the transmitter 97 are relatively low.

Provisions can be made in the circuit of FIG. 3 for those situations when more than one or a few channels being sampled has rapid variations. Such provisions may take the form of apparatus for raising the coefficient levels required to turn on the first OR gates 130 through 134. Another method is to make the commutator switches return to zero after traversing only a limited number of contacts, such as one-half of them, regardless of the information present, when the buffer storage 122 starts to fill up.

Figure 4:
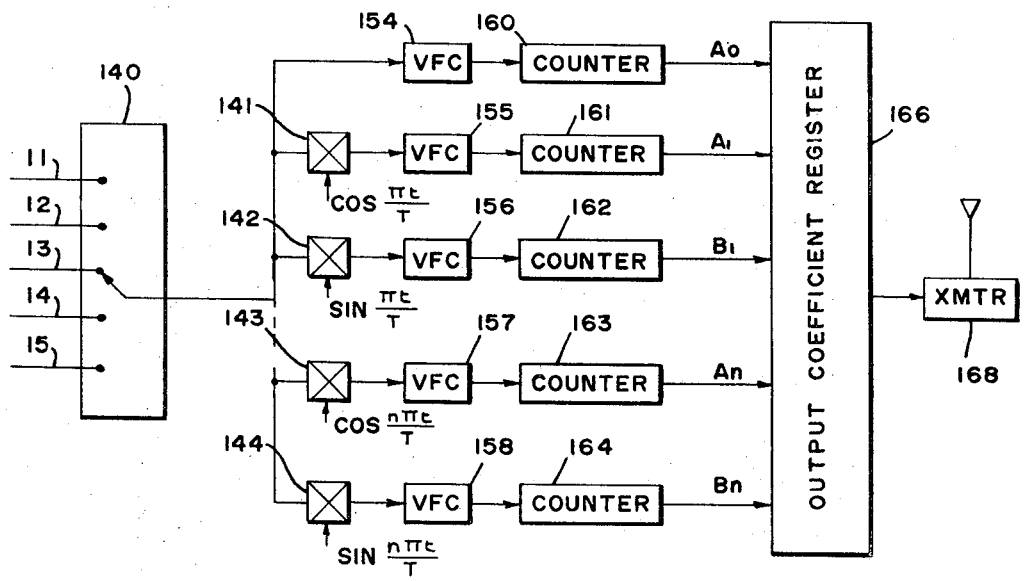
FIG. 4 is a block diagram representation of still another embodiment of the invention.

It should be understood that the generation of coefficients and other processing can be performed in either the digital or analogue domain. FIG. 4 illustrates a largely digital circuit which utilizes a commutator switch 140 whose output is multiplied by signals of various frequencies in multiplier circuits 141, 142, 143, and 144, etc., in the same manner as the circuits of FIGS. 1 and 3. However, the outputs of the multiplying circuits are passed to voltage-to-frequency converters 154, 155, 156, 157, and 158. The converters generate waves of a high frequency which are proportional to the voltage inputs thereto. The cycles of the outputs from the converters are counted in counters 160, 161, 162, 163, and 164. The digital outputs of these counters are entered in a register 166 for further processing and delivery to a transmitter 168. The counters and register of FIG. 4 are reset at the beginning of each new sampling period.

Although particular embodiments of the invention have been described and illustrated herein, it is recognized that modifications and variations may readily occur to those skilled in the art, and, consequently, it is intended that the claims be interpreted to cover such modifications and equivalents.

I claim:

1. Signal processing apparatus useful in a system which is employed for the time multiplex transmission of samples from a plurality of signal sources comprising:
    commutator means coupled to said plurality of signal sources for sampling said sources during predetermined sampling periods; and
    a plurality of sampling means coupled to said commutator means for respectively providing output signal components, each component representative of the amplitude of a different predetermined frequency component in the signal coupled to said plurality of sampling means during one of said sampling periods wherein the predetermined frequency of each of said components is an integral multiple of a frequency having a half-period equal to one of said sampling periods, whereby to enable a Fourier reconstruction of the sample.

2. Signal processing apparatus as defined in claim 1 including:

an initial sampling means coupled to said input signal for deriving the integral of said input signal during said sampling period; and wherein
each of said plurality of sampling means comprises means for generating a signal of predetermined frequency, means for multiplying said input signal wherein said signal of predetermined frequency, and means for integrating the product of said input signal and predetermined frequency signal over a period substantially equal to one of said sampling periods.

3. Signal processing apparatus as defined in claim 1 wherein:
    each of said plurality of sampling means comprises means for multiplying said input signal by a generated signal which is of a frequency that is an integral multiple of a fundamental frequency signal, and means for integrating said product during a sampling period; and
    said generated signals of a first group of said sampling means are at the same phase as said fundamental frequency signal at predetermined times spaced at integral multiples of said fundamental frequency signal, and said generated signals of a second group of said sampling means are 90° out of phase with said fundamental frequency signal at said predetermined times.

4. Signal processing apparatus for sampling a plurality of analogue signal sources comprising:
    commutator means having a plurality of input terminals for coupling to said signal sources, an output terminal, coupling means for coupling one of said input terminals to said output terminal, and means for advancing said coupling means to succeeding input terminals at the end of predetermined sampling periods; and
    sampling complex means coupled to said output terminal, including a plurality of coefficient generators for generating Fourier coefficients representing the amplitude of components of predetermined frequencies in inputs to said sampling complex during individual sampling periods.

5. Signal processing apparatus as defined in claim 4 wherein:
    a plurality of said coefficient generators comprises means for generating a signal of predetermined frequency, means for multiplying the output of said commutator means by said signal of predetermined frequency, and means for integrating the product of said means for multiplying over a period substantially equal to one of said sampling periods.

6. Signal processing apparatus as defined in claim 4 including:
    means responsive to the amplitude of said Fourier coefficients for transmitting signals representing only coefficients of lower frequency components when coefficients of higher frequency components are less than a predetermined level during a sampling period.

7. Signal processing apparatus as defined in claim 4 including:
    means responsive to the amplitude of said Fourier coefficients for generating output signals representing the amplitude of only groups of coefficients containing coefficients of more than a predetermined amplitude while generating no output signals for groups of coefficients containing no coefficients of more than said predetermined amplitude, for coefficients taken during a sampling period; and
    buffer storage means responsive to said output signals for transmitting signals representing said Fourier coefficients at a substantially constant rate, whereby to utilize a lower maximum bandwidth.